(12) United States Patent
Bachmann

(10) Patent No.: US 10,638,660 B2
(45) Date of Patent: May 5, 2020

(54) MOWING OR GRINDING DEVICE

(71) Applicant: ACTIBAC, Maizieres (FR)

(72) Inventor: Christophe Bachmann, Nancy (FR)

(73) Assignee: ACTIBAC, Maizieres (FR)

( * ) Notice: Subject to any disclaimer, the term of this patent is extended or adjusted under 35 U.S.C. 154(b) by 301 days.

(21) Appl. No.: 15/535,354

(22) PCT Filed: Dec. 7, 2015

(86) PCT No.: PCT/FR2015/053353
§ 371 (c)(1),
(2) Date: Aug. 31, 2017

(87) PCT Pub. No.: WO2016/097527
PCT Pub. Date: Jun. 23, 2016

(65) Prior Publication Data
US 2018/0027730 A1     Feb. 1, 2018

(30) Foreign Application Priority Data

Dec. 16, 2014   (FR) ..................................... 14 62479

(51) Int. Cl.
*A01D 34/535*     (2006.01)
*B02C 18/18*     (2006.01)

(52) U.S. Cl.
CPC ............ *A01D 34/535* (2013.01); *B02C 18/18* (2013.01)

(58) Field of Classification Search
CPC .... A01D 34/535; A01D 34/435; A01D 34/42; A01D 34/736; A01D 34/8355;
(Continued)

(56) References Cited

U.S. PATENT DOCUMENTS 2,827,751 A * 3/1958 Mascaro .............. A01D 34/535
                                                                                   56/249
3,177,640 A * 4/1965 Mott, Jr. .............. A01D 34/535
                                                                                   172/45

(Continued)

FOREIGN PATENT DOCUMENTS

CA       2391025 A1 * 12/2002 ........... A01D 34/733
EP       1319331 A1 *  6/2003 ............. A01F 12/40
(Continued)

*Primary Examiner* — Thomas B Will
*Assistant Examiner* — Joan D Misa
(74) *Attorney, Agent, or Firm* — Berenato & White, LLC

(57) ABSTRACT

A mowing or grinding device comprising a rotatable shaft which carries a plurality of mowing or grinding tools which form flails, each tool being mounted directly or indirectly on the rotatable shaft by means of at least one hinged connection with preferred positioning, which allows keeping the tool in the operating position to be favored and comprises a mounting aperture and an axial support which passes through the mounting aperture; the device being characterized in that the positioning portion of the axial support has at least one cylindrical boss which has a circular surface and the positioning portion of the mounting aperture has at least one concave housing which has a circular surface which is capable of receiving the circular surface of the cylindrical boss when the tool is in the operating position, the circular surface of the concave housing having a constant curve which is complementary to the circular surface of the cylindrical boss over a periphery which is greater than a quarter circle.

16 Claims, 8 Drawing Sheets

(58) Field of Classification Search
CPC ..... A01D 34/005; B02C 18/18; A01F 29/095; A01F 12/40; A01B 33/144
See application file for complete search history.

(56) References Cited

U.S. PATENT DOCUMENTS

| | | | | |
|---|---|---|---|---|
| 3,423,920 | A * | 1/1969 | Woodring | A01D 34/535 56/294 |
| 2002/0194829 | A1 * | 12/2002 | Petersen | A01D 34/733 56/255 |
| 2004/0155131 | A1 | 8/2004 | Bardos | |

FOREIGN PATENT DOCUMENTS

| | | | | |
|---|---|---|---|---|
| EP | 1723843 | A1 * | 11/2006 | ........... A01D 34/535 |
| EP | 2039234 | A1 | 3/2009 | |
| EP | 2241171 | A1 * | 10/2010 | ........... A01D 34/535 |
| EP | 2878188 | A1 * | 6/2015 | ........... A01D 34/535 |
| FR | 2173790 | A1 * | 10/1973 | ........... A01D 34/535 |
| FR | 2944182 | A1 | 10/2010 | |
| FR | 3013940 | A1 * | 6/2015 | ........... A01D 34/733 |
| GB | 895159 | A * | 5/1962 | ........... A01D 34/535 |
| GB | 1102517 | A | 2/1968 | |

* cited by examiner

MOWING OR GRINDING DEVICE

CROSS-REFERENCE TO RELATED APPLICATIONS AND CLAIM TO PRIORITY

This application is a national stage application of International Application No. PCT/FR2015/053353 filed Dec. 7, 2015, which claims priority to French Patent Application No. 1462479 filed Dec. 16, 2014, the disclosures of which are incorporated herein by reference and to which priority is claimed.

FIELD OF THE INVENTION

The invention relates to the area of mowing or grinding devices.

Such mowing or grinding devices are fitted notably on machines for cutting and/or grinding vegetal products such as rotary mowers which are used for cutting crops and flail mowers which are used for maintaining green spaces or roadside verges.

BACKGROUND OF THE INVENTION

The mowing or grinding devices comprise a rotatable shaft which carries tools which operate in the manner of flails during the rotation of the shaft. The rotatable shaft is provided with flanges which are positioned perpendicularly with respect to its axis, carry axial supports, which are arranged parallel to the axis of the rotatable shaft, and support the tools. The tools can be directly mounted on the axial supports. In this case, the tools are each provided with a mounting aperture through which one of the axial supports passes. The tools can also be mounted on the axial supports by means of shackles. In this case, each shackle comprises, on the one hand, mounting apertures through which an axial support passes which is carried by flanges which are connected to the rotatable shaft and, on the other hand, an axial support passes through a mounting aperture of the tool. Said assemblies are realized in such a manner that the tools and the shackles can turn freely with respect to the axial supports.

Thus, on the one hand, when the rotatable shaft is rotated, the tool is capable of being arranged in an operating position in which it extends radially with respect to the rotatable shaft under the effect of the centrifugal force. On the other hand, the tools can be retracted by the rotation of the shackle and/or the rotation of the tool so as to move away from their operating position when they come into contact with obstacles that they cannot cut or grind. Such a mowing or grinding device is described notably in French patent FR 2 944 182.

Furthermore, in the aforesaid document, the axial supports and the mounting apertures have forms which fit into one another when the tool is in its operating position so as to favor keeping the tool in the operating position. Said document discloses a large variety of forms of axial supports which are capable of telescoping into a complementary portion of the mounting aperture, for example triangular or octagonal overall. Such axial supports and mounting apertures allow optimum positioning of the tool in its operating position to be ensured compared to assemblies in which the axial supports have a circular section and the mounting apertures are oblong. Said assembly therefore allows the tools to return more quickly to their operating position whilst limiting the vibrations of the tools around their operating position.

It has nevertheless been noted that such axial supports and mounting apertures have been subject to wear and to rapid matting which impairs the service life of the mowing or grinding device which has been realized in this manner.

SUMMARY OF THE INVENTION

A concept underlying the invention is to propose a mowing or grinding device of the aforesaid type which allows the stability of the operating position of the tools to be ensured and which has satisfactory resistance to wear and tear.

According to an embodiment, the invention supplies a mowing or grinding device comprising a rotatable shaft which carries a plurality of mowing or grinding tools which form flails, each tool being mounted directly or indirectly on the rotatable shaft by means of at least one hinged connection with preferred positioning; the or each hinged connection with preferred positioning comprising, on the one hand, a mounting aperture and, on the other hand, an axial support which passes through said mounting aperture; the mounting aperture being greater in section than that of the axial support so as to allow the mounting aperture to pivot around the axial support, the axial support and the mounting aperture having positioning portions which are able to fit into one another when the tool is in an operating position in which the tool is arranged radially and has been moved away from the rotatable shaft, so as to favor keeping the tool in the operating position. The positioning portion of the axial support has at least one cylindrical boss which has a convex circular surface and the positioning portion of the mounting aperture has at least one concave housing which has a circular surface which is capable of receiving the circular surface of the cylindrical boss when the tool is in the operating position, the circular surface of the concave housing having a constant curve over a periphery which is greater than a quarter circle, the circular surface of the cylindrical boss having a constant curve which is complementary to the circular surface of the concave housing over a periphery which is greater than a quarter circle.

Thus, such a device is provided with a hinged connection with preferred positioning which allows the stability of the operating position to be ensured.

It is noted that the term "hinged connection with preferred positioning" is used here to designate a connection in which the axial support and the mounting aperture have positioning portions with complementary forms which ensure stable relative positioning of the tool in its operating position until a force exerted on the tool reaches a threshold value sufficient to destabilize said relative positioning. In this respect, we can also speak of a connection which ensures, under the effect of the rotation of the shaft, a preload between the axial support and the mounting aperture, that is to say creates internal stresses which are exerted between the axial support and the mounting aperture and are biased to keep the tool in its operating position.

In addition, the axial support and the mounting aperture cooperate together by means of a cylindrical contact surface such that the wear and tear and the matting on the parts are limited. In effect, with regard to the axial supports and the mounting apertures which have portions which telescope into one another, the section of which is triangular or octagonal overall in form and which only provides, as a result, one linear contact surface as soon as the tool is retracted compared to its rest position, a cylindrical contact surface allows a large contact surface to be arranged between the mounting aperture and the axial support whatever the position of the tool, which allows the wear and tear and the matting to be reduced. In addition, in the rest position, the circular surfaces cooperate together over a periphery which is greater than a quarter circle so as to ensure a contact surface which remains large even when the tool is moved away from its operating position.

According to other advantageous embodiments, such a device can have one or several of the following characteristics:

the circular surface of the cylindrical boss and the circular surface of the concave housing are arranged in order to guide the pivoting of the mounting aperture around the axial support with respect to the rest position;

the positioning portion of the axial support has two cylindrical bosses which have a convex circular surface and the positioning portion of the mounting aperture has two concave housings which each have a circular surface which is capable of receiving the circular surface of the one or the other of the two cylindrical bosses when the tool is in the operating position, the circular surface of each concave housing having a constant curve over a periphery which is greater than a quarter circle, the circular surface of the two cylindrical bosses having respectively a constant curve which is complementary to the circular surface of the one and the other of the concave housings over a periphery which is greater than a quarter circle.

The circular surface of the one of the cylindrical bosses and the circular surface of the respective concave housing are arranged in order to guide the pivoting of the mounting aperture around the axial support in a first movement zone of the mounting aperture around the axial support and the circular surface of the other of the cylindrical bosses and the circular surface of the respective concave housing are arranged in order to guide the pivoting of the mounting aperture around the axial support in a second movement zone; the first and the second movement zones corresponding respectively to a pivoting of the mounting aperture of the axial support on both sides of the operating position.

In an embodiment, the two cylindrical bosses are contiguous. In other words, the radii of curvature of the circular surfaces of the two cylindrical bosses are such that the two cylindrical bosses touch one another and extend over substantially the entire contact surface between the mounting aperture and the axial support.

In an embodiment, the circular surfaces of the two cylindrical bosses have identical radii of curvature. The mounting aperture and the axial support each have an axis of symmetry such that the device can be used in an identical manner whatever the direction of rotation of the rotatable shaft.

In another embodiment, the circular surfaces of the two cylindrical bosses have different radii of curvature. Such an embodiment is particularly suitable for a device in which the rotatable shaft is only made to rotate in one direction of rotation. The bosses and their housings are therefore arranged in one direction or in the other following the direction of rotation of the shaft carrying the tools. Thus, when the rotatable shaft is intended to be rotated in a first direction of rotation, the hinged connection with preferred positioning is arranged such that the cylindrical boss, which has the circular surface with the largest radii of curvature, is positioned in front of the other cylindrical boss in the running direction when the rotatable shaft is rotated in said first direction of rotation.

The mounting aperture comprises a rib which is situated between the two concave housings and is capable of being accommodated in a hollow which is arranged between the two cylindrical bosses of the axial support when the tool is in the operating position.

In an embodiment, the axial support comprises two cylindrical rods which are placed side by side and which form the two cylindrical bosses of the positioning portion of the axial support.

According to an embodiment, an axial support of at least one hinged connection with preferred positioning is carried by two flanges which are fixed to the rotatable shaft.

In another embodiment, the two cylindrical bosses of the positioning portion of the axial support are formed in a same part.

The circular surface of the concave housing has a constant curve which is complementary to the circular surface of the cylindrical boss over a periphery which develops at an angle of between 110 and 130° inclusive.

In an embodiment, the tool is mounted on the shaft by means of a shackle and the shackle is connected to the tool or to the shaft by means of a hinged connection with preferred positioning.

In another advantageous embodiment, the shackle is connected to the tool by means of a hinged connection with preferred positioning and connected to the shaft by means of another hinged connection with preferred positioning. According to a variant, the axial support which is carried by the rotatable shaft as well as the axial support which is carried by the shackle are substantially of the same form. Likewise, the mounting aperture of the shackle and the mounting aperture of the tool are substantially of the same form.

The general form of the axial support is non-circular.

In an embodiment, the tool is mounted directly on the rotatable shaft by means of the hinged connection with preferred positioning.

The tool comprises a cutter and the mounting aperture a hinged connection with preferred positioning.

The axial support of the hinged connection with preferred positioning is carried by a first element chosen from the tool, the shackle or the rotatable shaft and the mounting aperture is carried by a second element, which is adjacent to said first element, chosen from the tool, the shackle or the rotatable shaft.

According to an embodiment, the invention also provides a mobile machine for cutting and/or grinding vegetation such as a rotary mower, a flail mower or a grinding machine, which is fitted with an aforesaid device.

Apart from cutting and/or grinding vegetation, such a machine can have other uses, such as grinding stones.

BRIEF DESCRIPTION OF THE DRAWINGS

The invention will be better understood, and other aims, details, characteristics and advantages of the same will appear more clearly during the following description of several specific embodiments of the invention, given solely for illustrative purposes without limitation, with reference to the accompanying drawings.

DETAILED DESCRIPTION OF THE PREFERRED EMBODIMENT(S)

Figure 1:
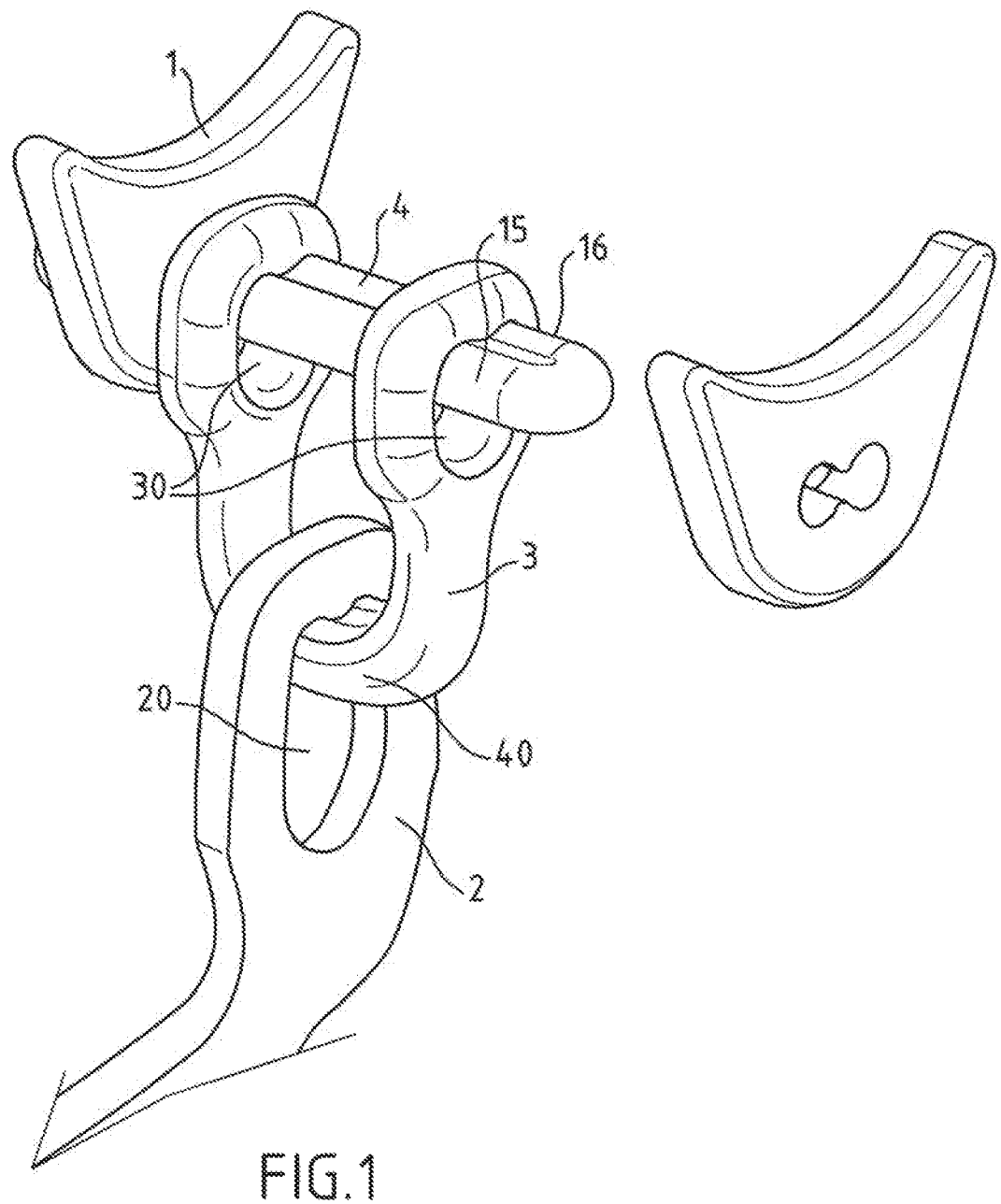
FIG. 1 is a partial view in perspective of a mowing or grinding device.
Figure 2:
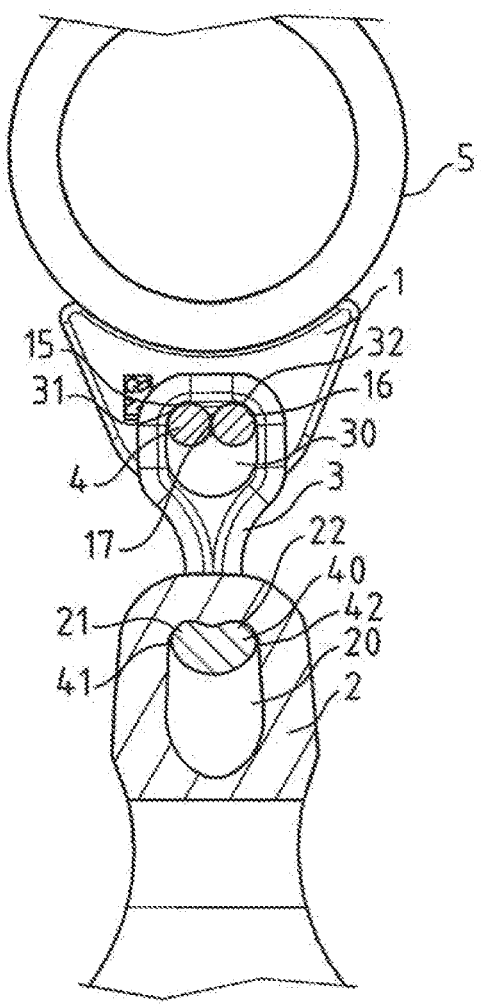
FIG. 2 is a sectional view of the device in FIG. 1 in which the tool is shown in an operating position and the rotatable shaft is shown in a schematic manner.
Figure 3:
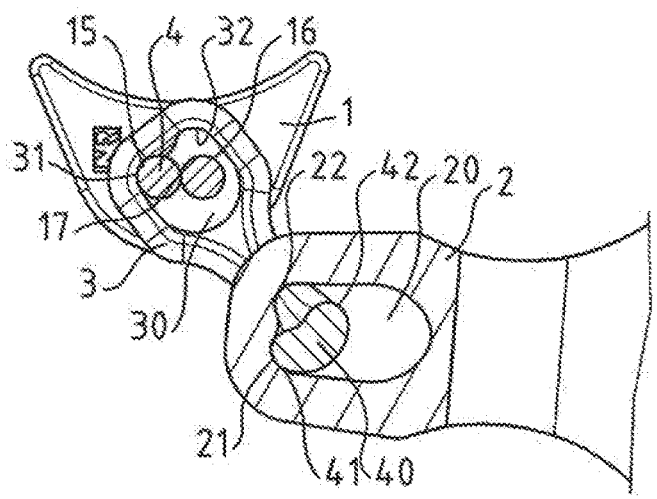
FIG. 3 is a sectional view of the device in FIG. 1 in which the tool is shown in a retracted position.

FIGS. 1 to 3 show a mowing or grinding device according to a first embodiment.

The device comprises a plurality of mowing or grinding tools 2, just one of which is shown here, which are connected to a rotatable shaft 5, which is generally hollow, shown in FIG. 2. The rotatable shaft 5 can be rotatably mounted on a cutting or grinding machine, along a horizontal, vertical or oblique rotational axis.

The tool 2 is connected to the rotatable shaft 5 either directly or by means of a shackle 3, as shown in the embodiment illustrated. The tool 2 is mounted in a hinged manner with respect to the rotatable shaft 5 so as to be able to be positioned, under the effect of the centrifugal force engendered by the rotation of the rotatable shaft, in an operating position in which it is arranged radially with respect to the rotatable shaft 5 and to be retracted by moving away from its operating position when it meets an obstacle. The tool 2 comprises a cutter which constitutes an operating part which is provided with beveled portions which allow vegetation or stones to be cut or ground.

In FIGS. 1 to 3, the tool 2 is carried by the shackle 3 and, to this end, comprises a mounting aperture 20 through which passes an axial support 40 which is carried by the shackle 3. The shackle 3, itself, is connected to the rotatable shaft 5 by means of two mounting apertures 30 of the shackle 3 through which passes an axial support 4 which is fixed to the rotatable shaft 5. The axial support 4 extends parallel to the axis of rotation of the rotatable shaft 5 and is carried by two flanges 1 which are fixed to the rotatable shaft 5. The axial support 4 is mounted through bores which are arranged in said flanges 1.

In FIGS. 1 to 3, the axial support 4 which is carried by the rotatable shaft 5 comprises two cylindrical rods which are arranged side by side and each form a circular and cylindrical boss 15, 16. In an embodiment variant shown in FIG. 4, the axial support 4 is formed by one single integrally molded part which has two cylindrical bosses 15, 16, which are directed radially toward the interior, that is to say toward the rotatable shaft 5, and have convex circular surfaces. For said two embodiments, the axial support 4 or 14 comprises a hollow 17 between the two bosses 15, 16.

The mounting apertures 30 of the shackle 3 have dimensions that are slightly larger than those of the axial support 4 or 14 so as to allow the shackle 3 to pivot around the axial support, notably when the tool 1 meets an obstacle. Furthermore, the mounting apertures 30 of the shackle 3 each comprise two concave housings 31, 32 which are arranged at their radially inside edge. Each concave housing 31, 32 has a circular surface which is capable of receiving the circular surface of a respective cylindrical boss 15, 16 when the tool 2 is in its operating position. The circular surface of each of the concave housings 31, 32 has a constant curve which is complementary to the circular surface of the associated cylindrical boss 15, 16. The zone of the mounting apertures 30 which separates the two housings 31 and 32 comprises a rib 33 which has a form which is complementary to that of the hollow 17 which is formed between the two bosses 15, 16 of the axial support 4, 14.

It is thus understood that the mounting apertures 30 of the shackle 3 and the axial support 14 which is carried by the rotatable shaft 5 constitute a mobile connection with preferred positioning, the cylindrical bosses 15, 16 and the concave housings 31, 32 forming positioning portions which are capable of fitting one into the other when the tool 2 is in its operating position so as to favor the positioning of the tool 2 in said operating position. In addition, cylindrical contact surfaces allow the pivoting movement of the shackle 3 to be guided around the axial support 4 or 14.

Figure 5:
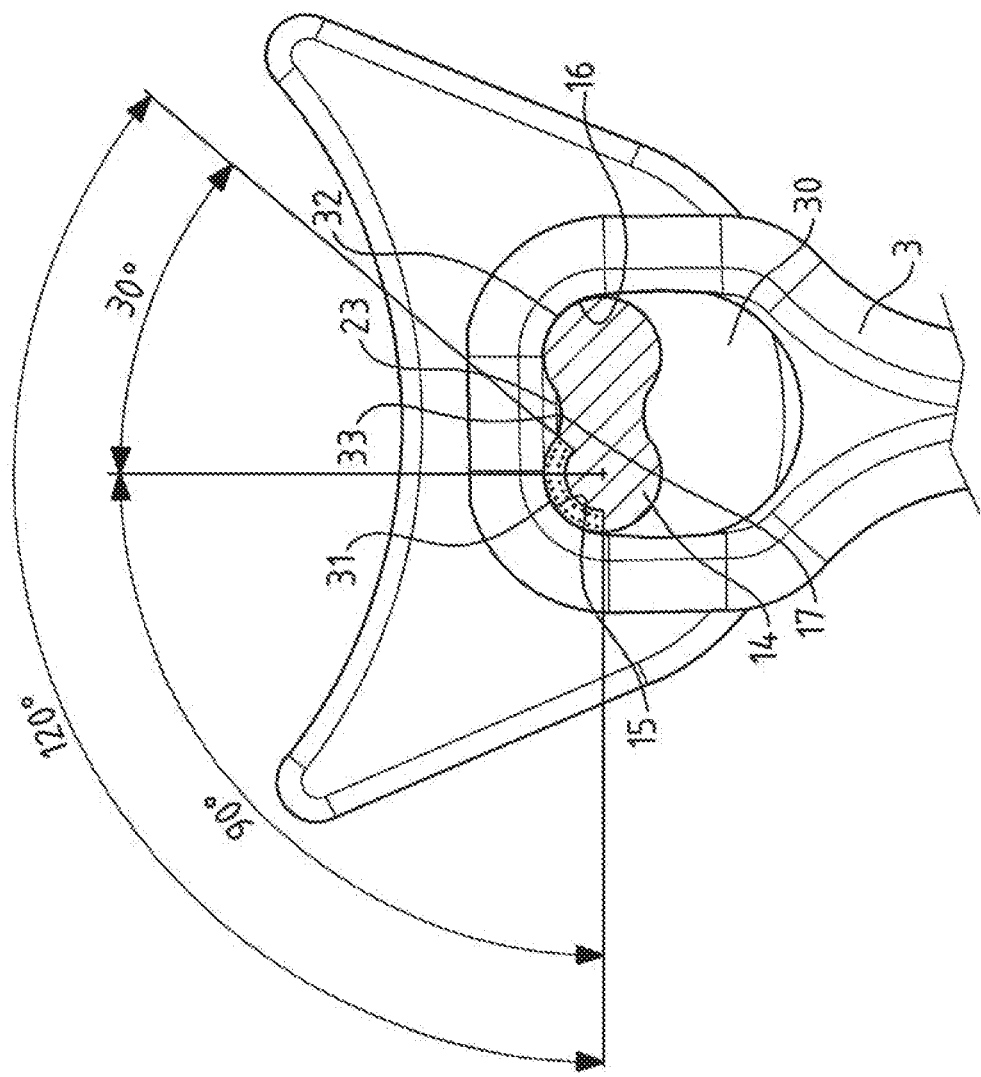
FIG. 5 is a view of a detail of part of FIG. 4.

As shown in FIG. 5, each concave housing 31, 32 has a circular surface which comprises a constant curve which is complementary to the circular surface of the associated cylindrical boss 15, 16 at an angle of more than 90° and in a preferred manner at an angle of between 110 and 130° inclusive, for example in the order of 120°. Such cooperation between the mounting aperture 30 and the axial support 14 allows large dimension cylindrical contact surfaces to be obtained so as to limit the wear and tear and the matting of the parts.

Likewise, the mounting aperture 20 of the tool 2 forms with the axial support 40, which is carried by the shackle 3, a hinged connection with preferred positioning which has a structure which is similar to that of the above-described connection between the shackle 3 and the rotatable shaft 5.

In fact, the mounting aperture 20 of the tool 2 comprises, on its radially inside edge, two concave housings 21, 22 which have a circular surface. A rib 23 is arranged between the two housings 21 and 22. The shackle 3 comprises an axial support 40 which crosses the aperture 20. The dimensions of the axial support 40 are less than those of the mounting aperture 20 of the tool 2 so as to allow the tool 2 to pivot around the axial support 40.

Moreover, the axial support 40 comprises two bosses 41 and 42 which are partially cylindrical and have a form which is complementary to that of the housings 21 and 22 of the mounting aperture 20 so as to lodge there when the tool is in the operating position. Between the two bosses 41 and 42, the axis 40 comprises a hollow 43 which has a form which is complementary to that of the rib 23.

As well as in the case of bosses 15 and 16 and of housings 31 and 32, each concave housing 21, 22 has a circular surface which has a constant curve which is complementary to the circular surface of the associated cylindrical boss 41, 42 at an angle of more than 90° and, in a preferred manner, at an angle between 110 and 130° inclusive, for example in the order of 120°.

The operation of the device thus described is as follows. When the rotatable shaft 5 of the mowing or grinding machine rotates at high speed, the shackle 3 and the tool 2, under the effect of the centrifugal force, take up the operating position which is shown in FIGS. 1, 2, 4 and 5.

When the tool 2 meets vegetation that is too dense, said vegetation exerts a strain on the tool 2 which is sufficient to destabilize the tool 2 out of its operating position and cause the shackle 3 and the tool 2 to retract, as is shown in FIG. 3. The tool 2 may also meet a stone, a stump or a branch which is too thick and constitutes an obstacle against which the tool 2 strikes and which causes the shackle 3 and the tool to retract with respect to their operating position.

Thanks to the complementary forms of the bosses 15, 16, 41, 42 of the housings 21, 22, 31, 32 and of the ribs 23, 33 which penetrate into the hollows 17, 41, said elements are predisposed to telescope into one another when the tool 2 is in the operating position; which bestows a large degree of stability on the device and allows the elements to return rapidly to their operating position after retraction.

Referring to FIG. 3, it can be observed that an embodiment in which the tool 2 is associated with the rotatable shaft 5 by means of a shackle 3 allows for a double retraction since the tool 2 has pivoted around the axial support 40, which is carried by the shackle 3, and the shackle 3 has pivoted around the axial support 4, which is carried by the rotatable shaft 5.

Furthermore, in an embodiment which is not shown, the tool 2 is directly connected to the axial support 4 or 14 which is carried by the rotatable shaft 5, that is to say without the help of a shackle 3, the axial support 4 or 14 therefore serves as support for the tool 2 and, as a result, is introduced through the mounting aperture 20 of the tool 2. The cylindrical bosses 15, 16 of the axial support 4 or 14 therefore have forms which are complementary to those of the concave housings 21, 21 which are arranged in the mounting aperture 20 of the tool 2.

Figure 6:
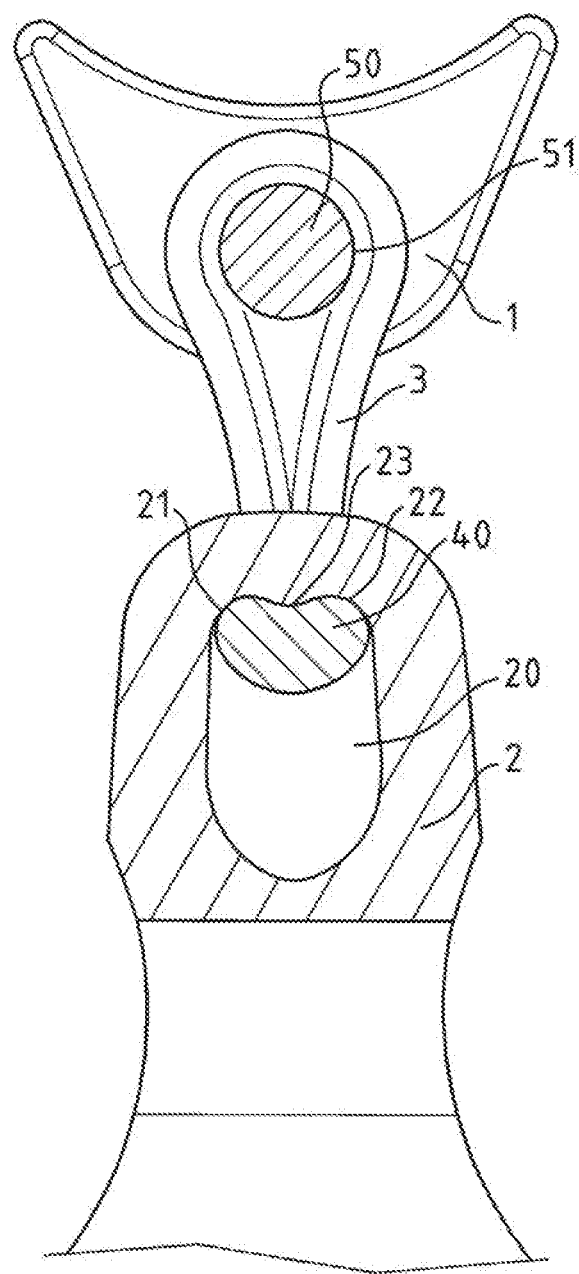
FIG. 6 illustrates a device according to a second embodiment in a schematic manner, the tool being shown in the operating position.
Figure 7:
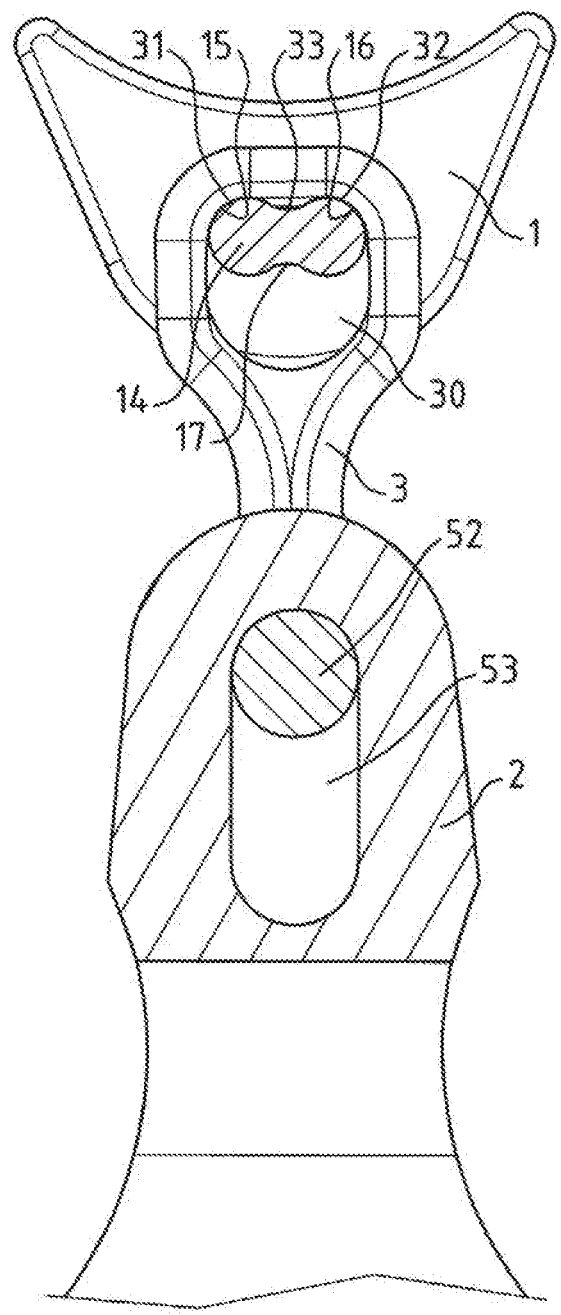
FIG. 7 illustrates a device according to a third embodiment in a schematic manner, the tool being shown in the operating position.

FIGS. 6 and 7 show the devices respectively in a second and third embodiment. In said embodiments, only the connection between the tool 2 and the shackle 3 or the connection between the shackle 3 and the rotatable shaft 5 is obtained by means of a hinged connection with preferred positioning such as described above.

Thus, in FIG. 6, the axial support which is carried by the flanges 1 which are fixed to the rotatable shaft 5 is a simple cylindrical rod 50 and the mounting apertures of the shackle 3 are simple circular apertures 51 through which the cylindrical rod 50 passes.

In FIG. 7 it is the connection between the shackle 3 and the tool 2 which is simplified. Thus, the axial support of the shackle 3 is a cylindrical rod 52 and the mounting aperture 20 of the tool 2 is an opening with an oblong shape 53, into the interior of which the cylindrical rod 52 passes.

In all the embodiments described above, for each hinged connection with preferred positioning, the two concave housings 21, 22, 31, 32 and the two cylindrical bosses 15, 16, 41, 42 are symmetrical, which allows contact surfaces to be obtained between the mounting apertures 23, 30 and the axial supports 4, 14, 40 which are identical in dimension, and the tool 2 to pivot in one direction or the other. Such devices will therefore have an identical function whatever the direction of rotation of the rotatable shaft.

Figure 4:
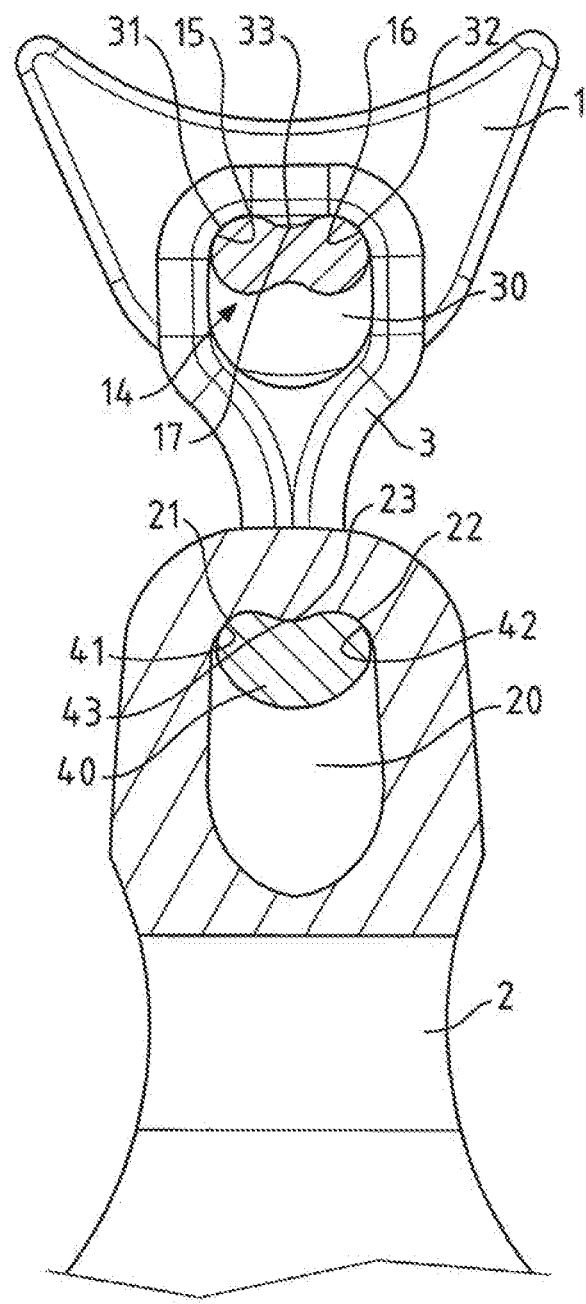
FIG. 4 illustrates a variant of the embodiment of the device in FIGS. 1 to 3, the tool being shown in the operating position.
Figure 8:
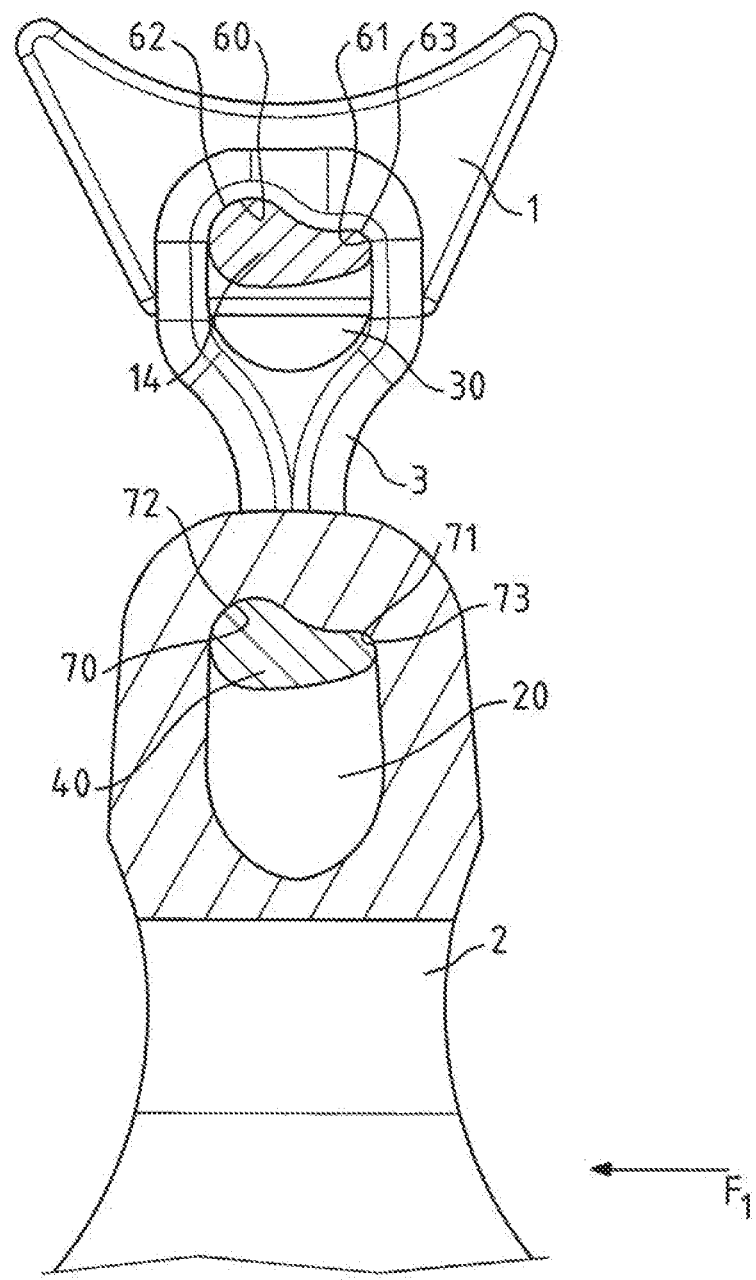
FIG. 8 illustrates a device according to a fourth embodiment in a schematic manner, the tool being in the operating position and the rotatable shaft being intended to be driven in a clockwise direction.
Figure 9:
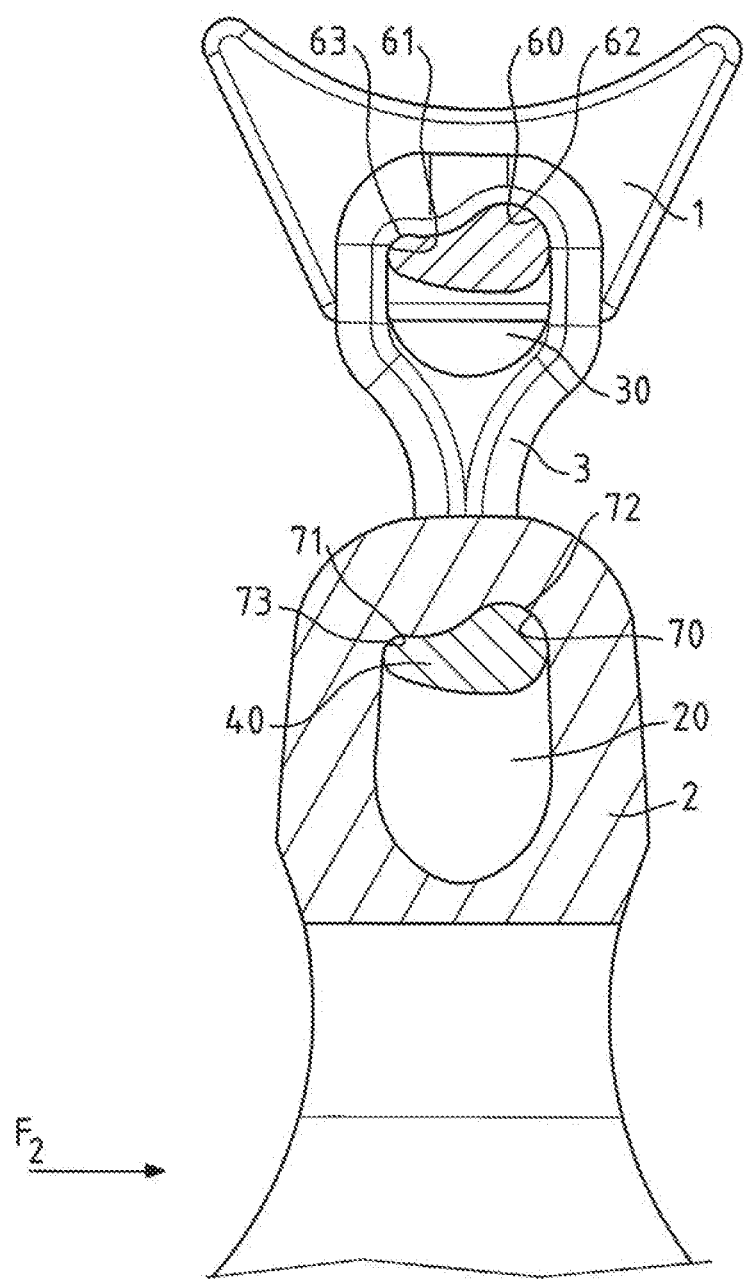
FIG. 9 shows the arrangement of the device in FIG. 8 when the rotatable shaft is intended to be driven in an anticlockwise direction.

The embodiment shown in FIGS. 8 and 9 differs from the embodiment in FIGS. 4 and 5 in that the cylindrical surfaces of the two cylindrical bosses 60, 61, 70, 71 of each axial support 14, 40, on the one hand, and the cylindrical surfaces of the concave housings 62, 63, 72, 73 of each mounting aperture 30, 20, on the other hand, are asymmetrical and have different radii of curvature. Such an arrangement, allows a larger cylindrical contact surface to be allocated to the cylindrical bosses 60, 70 and to the concave housings 62, 72 which will be the most frequently used when the tool 2 pivots between its operating position and a retracted position.

Thus, according to whether the rotatable shaft 5 is intended to be rotated in the clockwise direction, shown by the arrow F1 in FIG. 8, or in an anticlockwise direction, shown by the arrow F2 in FIG. 9, the arrangement of the elements of the device will be reversed. It is thus noted, in FIGS. 8 and 9, that to allocate the largest contact surface to the cylindrical bosses 60, 70 and to the concave housings 62, 72 which will be the most frequently used, the elements of the device are oriented in such a manner that the cylindrical bosses 60, 70 and the concave housings 62, 72 which have the circular surfaces with the largest radii of curvature are positioned toward the front with respect to the other cylindrical bosses 61, 71 and concave housings 63, 73 in the circumferential running direction.

It should also be noted that, in an embodiment which is not shown, a or each hinged connection with preferred positioning can have an axial support, the positioning portion of which, capable of fitting together with the positioning portion of the mounting aperture, may only have one single cylindrical boss with a circular surface, the other boss or the other bosses having any other form. In such a case, the cylindrical boss is therefore arranged at the front of the axial support in the running direction of the rotatable shaft when said rotatable shaft is rotated.

Although the invention has been described in conjunction with several specific embodiments, it is quite clear that it is in no way limited by this and that it includes all the technical equivalents of the means described as well as their combinations if these are within the framework of the invention.

In particular, it should be noted that in other embodiments which are not shown, it is possible to envisage reversing the structure of the elements such that, on the one hand, the tool comprises an axial support and not a mounting aperture, and the connection element which is carried by the rotatable shaft has a mounting aperture and not an axial support.

The use of the verbs "comprise", "include" or "encompass" and their conjugated forms does not exclude the presence of elements or stages other than those stated in a claim. The use of the indefinite article "a" or "an" for an element or a stage does not exclude, unless otherwise stated, the presence of a plurality of such elements or stages.

In the claims, any reference sign between brackets shall not be interpreted as a limitation of the claim.

The invention claimed is:

1. A mowing or grinding device comprising a rotatable shaft (5) which carries a plurality of mowing or grinding tools (2) which form flails, each tool (2) being mounted directly or indirectly on the rotatable shaft (5) by means of at least one hinged connection; the at least one hinged connection comprising a first part having a mounting aperture (20, 30) and, on the other hand, a second part having an axial support (4, 14, 40) which passes through said mounting aperture (20, 30); the mounting aperture (20, 30) being greater in section than that of the axial support (4, 14, 40) so as to allow the first part having the mounting aperture (20, 30) to pivot around the axial support (4, 14, 40) of the second part; the axial support (4, 14, 40) and the mounting aperture (20, 30) having each a positioning portion, the positioning portion of the axial support and the positioning portion of the mounting aperture being able to fit into one another when the tool is in an operating position in which the tool is arranged radially and has been moved away from the rotatable shaft (5), so as to favor keeping the tool in the operating position; wherein the positioning portion of the axial support (4, 14, 40) has at least one cylindrical boss (15, 16, 41, 42, 60, 61, 70, 71) which has a convex circular surface and the positioning portion of the mounting aperture (20, 30) has at least one concave housing (21, 22, 31, 32, 62, 63, 72, 73) which has a circular surface which is capable of receiving the circular surface of the cylindrical boss (15, 16, 41, 42, 60, 61, 70, 71) when the tool is in the operating position, the circular surface of the concave housing (21, 22, 31, 32, 62, 63, 72, 73) having a constant curve over a periphery which is greater than a quarter circle, the circular surface of the cylindrical boss (15, 16, 41, 42, 60, 61, 71, 72) having a constant curve which is complementary to the circular surface of the concave housing over a periphery which is greater than a quarter circle.

2. The device as claimed in claim 1, wherein the positioning portion of the axial support (4, 14, 40) has two cylindrical bosses (15, 16, 41, 42, 60, 61, 70, 71) which have a convex circular surface and the positioning portion of the mounting aperture (20, 30) has two concave housings (21, 22, 31, 32, 62, 63, 72, 73) which each have a circular surface which is capable of receiving the circular surface of the one or the other of the two cylindrical bosses when the tool is in the operating position, the circular surface of each concave housing having a constant curve over a periphery which is greater than a quarter circle, the circular surface of the two cylindrical bosses having respectively a constant curve which is complementary to the circular surface of the one and the other of the concave housings over a periphery which is greater than a quarter circle.

3. The device as claimed in claim 2, wherein the two cylindrical bosses (15, 16, 41, 42, 60, 61, 70, 71) are contiguous.

4. The device as claimed in claim 3, wherein the circular surfaces of the two cylindrical bosses (15, 16, 41, 42) have identical radii of curvature.

5. The device as claimed in claim 3, wherein the circular surfaces of the two cylindrical bosses (60, 61, 70, 71) have different radii of curvature.

6. The device as claimed in claim 5, wherein the rotatable shaft (5) is intended to be rotated in a first direction of rotation and wherein the at least one hinged connection is arranged such that the cylindrical boss (60, 70) which has the circular surface having the largest radii of curvature is positioned in front of the other cylindrical boss (61, 71) in the running direction when the rotatable shaft (5) is rotated in said first direction of rotation.

7. The device as claimed in claim 2, wherein the circular surfaces of the two cylindrical bosses (15, 16, 41, 42) have identical radii of curvature.

8. The device as claimed in claim 2, wherein the circular surfaces of the two cylindrical bosses (60, 61, 70, 71) have different radii of curvature.

9. The device as claimed in claim 8, wherein the rotatable shaft (5) is intended to be rotated in a first direction of rotation and wherein the at least one hinged connection is arranged such that the cylindrical boss (60, 70) which has the circular surface having the largest radii of curvature is positioned in front of the other cylindrical boss (61, 71) in the running direction when the rotatable shaft (5) is rotated in said first direction of rotation.

10. The device as claimed in claim 2, wherein the mounting aperture (20, 30) comprises a rib (23, 33) which is situated between the two concave housings (21, 22, 41, 42) and is capable of being accommodated in a hollow (17) which is arranged between the two cylindrical bosses (15, 16) of the axial support (14, 40) when the tool (2) is in the operating position.

11. The device as claimed in claim 2, wherein the axial support (4) comprises two cylindrical rods which are placed side by side and which form the two cylindrical bosses (15, 16) of the positioning portion of the axial support (4).

12. The device as claimed in claim 2, wherein the two cylindrical bosses (41, 42, 60, 61, 70, 71) of the positioning portion of the axial support (14, 40) are formed in a same part.

13. The device as claimed in claim 1, wherein the circular surface of the concave housing (21, 22, 31, 32) has a constant curve which is complementary to the circular surface of the associated cylindrical boss (15, 16, 41, 42) over a periphery which develops at an angle of between 110 and 130° inclusive.

14. The device as claimed in claim 1, wherein the tool is mounted on the shaft by means of a shackle (3) and wherein the shackle (3) is connected to the tool (2) or to the rotatable shaft (5) by means of the hinged connection.

15. The device as claimed in claim 1, wherein the tool (2) is mounted directly on the rotatable shaft (5) by means of the hinged connection.

16. The device as claimed in claim 1, wherein the tool (2) comprises a cutter and the mounting aperture (20) of the hinged connection.

\* \* \* \* \*